(12) United States Patent
Watanabe et al.

(10) Patent No.: US 8,796,379 B2
(45) Date of Patent: *Aug. 5, 2014

(54) POLYETHER POLYCARBONATE

(75) Inventors: Yoshihiko Watanabe, Wakayama (JP);
Shuichiro Kobaru, Wakayama (JP);
Masato Oshika, Tokyo (JP); Genichi Nakamura, Tokyo (JP)

(73) Assignee: Kao Corporation, Tokyo (JP)

( * ) Notice: Subject to any disclaimer, the term of this patent is extended or adjusted under 35 U.S.C. 154(b) by 913 days.

This patent is subject to a terminal disclaimer.

(21) Appl. No.: 12/669,219

(22) PCT Filed: Jul. 17, 2008

(86) PCT No.: PCT/JP2008/063330
§ 371 (c)(1),
(2), (4) Date: May 14, 2010

(87) PCT Pub. No.: WO2009/011455
PCT Pub. Date: Jan. 22, 2009

(65) Prior Publication Data
US 2010/0233378 A1    Sep. 16, 2010

(30) Foreign Application Priority Data

Jul. 19, 2007 (JP) ................. 2007-187792

(51) Int. Cl.
C08G 67/02 (2006.01)
(52) U.S. Cl.
USPC ........................................ 524/612
(58) Field of Classification Search
None
See application file for complete search history.

(56) References Cited

U.S. PATENT DOCUMENTS

| | | | |
|---|---|---|---|
| 4,506,045 A | 3/1985 | Waniczek et al. | |
| 4,833,036 A | 5/1989 | Cannarsa et al. | |
| 5,171,830 A * | 12/1992 | Grey | 528/371 |
| 5,387,354 A | 2/1995 | Mizui et al. | |
| 5,463,012 A | 10/1995 | Ferruti et al. | |
| 5,683,612 A | 11/1997 | Birnbrich et al. | |
| 5,795,952 A * | 8/1998 | Greco | 528/196 |
| 5,847,069 A | 12/1998 | Greco | |
| 2001/0047073 A1 | 11/2001 | Mizia et al. | |
| 2007/0155933 A1 | 7/2007 | Watanabe et al. | |

FOREIGN PATENT DOCUMENTS

| EP | 0 335 416 A2 | 10/1989 |
|---|---|---|
| EP | 0 798 328 A2 | 10/1997 |
| EP | 1 134 248 A1 | 9/2001 |
| JP | 54 96539 | 7/1979 |
| JP | 56 26968 | 3/1981 |
| JP | 59 86639 | 5/1984 |
| JP | 4 8725 | 1/1992 |
| JP | 5 279468 | 10/1993 |
| JP | 5-279468 A | 10/1993 |
| JP | 6 508383 | 9/1994 |
| JP | 9 235537 | 9/1997 |
| JP | 9 508674 | 9/1997 |
| JP | 10 45678 | 2/1998 |
| JP | 2005 232447 | 9/2005 |
| JP | 2008 24849 | 2/2008 |
| JP | 2008-24849 A | 2/2008 |

OTHER PUBLICATIONS

Yu et al., Biomaterials 20 (1999), 253-264.*
Extended European Search Report issued Nov. 7, 2012, in Patent Application No. 08791581.5.
U.S. Appl. No. 13/144,647, filed Jul. 14, 2011, Oshika, et al.
Office Action issued Jul. 3, 2010, in Japanese Patent Application No. 2008-185035 (with English translation).
Office Action issued Aug. 31, 2011 in Chinese Patent Application No. 200880024104.9 (with English translation).

* cited by examiner

*Primary Examiner* — Susannah Chung
*Assistant Examiner* — Robert T Butcher
(74) *Attorney, Agent, or Firm* — Oblon, Spivak, McClelland, Maier & Neustadt, L.L.P.

(57) ABSTRACT

The present invention provides polyether polycarbonate having a constituent unit represented by the formula (I), a method for producing the same, an adhesive composed of the same, an adhesive composition containing the same, an adhesive sheet having a layer of the adhesive composition, a method for producing an adhesive article by dissolving the polyether polycarbonate in a solvent selected from water and alcohols having 1 to 4 carbon atoms, coating the solution on an adherend, and volatilizing the solvent, and an alcohol solution containing the polyether polycarbonate.

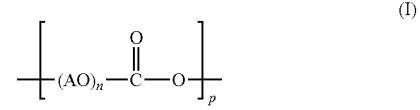

(I)

where A represents an alkylene group having 2 to 6 carbon atoms; n represents an average number ranging from 5 to 1,000; and p represents an average number ranging from 5 to 100, wherein (n×p) A's may be the same as or different from one another.

14 Claims, No Drawings

POLYETHER POLYCARBONATE

CROSS REFERENCE TO RELATED APPLICATION

This application is a 371 of PCT/JP2008/063330, filed on Jul. 17, 2008, and claims priority to Japanese Patent Application No. 2007-187792, filed on Jul. 19, 2007.

FIELD OF THE INVENTION

The present invention relates to polyether polycarbonate, a method for producing the same, an adhesive, and an adhesive composition containing the adhesive.

BACKGROUND OF THE INVENTION

Selective adhesives are used for bundling vegetables and plants. For such an adhesive, those produced by blending a natural rubber and/or a synthetic rubber with a tackifier and/or a softening agent have been known (JP-A54-96539 and JP-A56-26968). There is also known an adhesive having a polycarbonate structure in order to solve a problem of adhesion of the adhesive to a finger and an article in use (JP-A9-235537).

SUMMARY OF THE INVENTION

The present invention provides polyether polycarbonate having a constituent unit represented by the formula (I), a method for producing the same, an adhesive containing the same, an adhesive composition containing the same, an adhesive sheet having a layer of the adhesive composition, a method for producing an adhesive article by dissolving the polyether polycarbonate in a solvent selected from water and alcohols having 1 to 4 carbon atoms, coating the solution on an adherend, and volatilizing the solvent, and an alcohol solution containing the polyether polycarbonate.

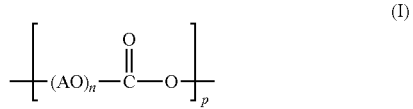

where A represents an alkylene group having 2 to 6 carbon atoms; n represents an average number ranging from 5 to 1,000; and p represents an average number ranging from 5 to 100, wherein (n×p) A's may be the same as or different from one another.

DETAILED DESCRIPTION OF THE INVENTION

Known selective adhesives have low solubility in solvents, and specific solvents must be used such as aromatic hydrocarbon-based solvents (e.g., toluene) and acetone. These adhesives thus have a low degree of freedom in blending and processing, and also a problem of difficulty in cleaning off an adhesive attached on a finger or the like in use.

The present invention provides polyether polycarbonate useful as an adhesive having selective adhesive properties and solubility in water, an alcohol, or the like, and an adhesive composition containing the polyether polycarbonate.

The present inventors have found that polyether polycarbonate having, as a constituent unit, a specific polycarbonate structure with an alkyleneoxy chain has selective adhesive properties and dissolves in water, an alcohol, or the like.

According to the present invention, a new polyether polycarbonate useful as an adhesive or the like can be provided, and further a new adhesive having selective adhesive properties and dissolving in water, alcohol, or the like can be provided. The adhesive composition containing the polyether polycarbonate of the present invention has a high degree of freedom in blending and processing, and is easy to be cleaned off from a finger or the like when attached in use.

The adhesive of the present invention has a selective adhesive property, that is, it adheres to itself, but has only a low adhesion to others.

The present invention also provides use of the polyether polycarbonate as an adhesive and use of the polyether polycarbonate produced by the method of the present invention as an adhesive.

[Polyether Polycarbonate and Adhesive]

The polyether polycarbonate of the present invention has the constituent unit represented by the formula (I). The adhesive of the present invention comprises the polyether polycarbonate of the present invention.

In the formula (I), A represents an alkylene group having 2 to 6 carbon atoms. (n×p) A's, (n×p) being the number of A, may be the same as or different from one another, but preferably include two or more different alkylene groups. A's are preferably alkylene groups each having 2 to 4 carbon atoms, more preferably each having 2 or 3 carbon atoms, and even more preferably mixed groups of ethylene group and propylene group. When the polyether polycarbonate of the present invention has different alkyleneoxy groups, it may have a block or random structure, and preferably a random structure.

In the formula (I), n represents an average addition mole number of alkyleneoxy group ranging from 5 to 1,000, and preferably 10 to 500. p represents an average repeat number of $[(AO)_n COO]$ group ranging from 5 to 100, and preferably 5 to 50.

From the viewpoint of decreasing a sticky property of the adhesive, a weight-average molecular weight of the polyether polycarbonate is preferably not less than 50,000, more preferably not less than 100,000, even more preferably not less than 150,000, and even more preferably not less than 200,000. From the viewpoint of exhibiting sufficient adhesion at normal temperature, the weight-average molecular weight is preferably not more than 1,000,000, more preferably not more than 700,000, and even more preferably not more than 500,000.

Note that a weight-average molecular weight of the polyether polycarbonate is a value measured by the method described in Examples below.

[Method for Producing Polyether Polycarbonate]

The polyether polycarbonate of the present invention may be produced by methods (1) and (2). The method (1) is preferred.

(1) a method including transesterifying between carbonate ester and polyether diol.

(2) a method including reacting phosgene with polyether diol.

Examples of the carbonate ester used in the method of the present invention include dimethyl carbonate, diphenyl carbonate, diethyl carbonate, ethylene carbonate, and propylene carbonate. Preferred are dimethyl carbonate and diphenyl carbonate.

Examples of the polyether diol used in the method of the present invention include polyethylene glycol, polypropylene glycol, polytetramethylene glycol, and copolymers of ethylene oxide and propylene oxide. Preferred are random copolymers of ethylene oxide and propylene oxide. Commercial products may also be used for the polyether diol. Examples of the commercial product include Adeka polyethers PR-3005, 3007, and PR-5007 (ADEKA Corporation).

From the viewpoint of achieving good solubility in water and an alcohol, a number-average molecular weight of the polyether diol used in the present invention is preferably 200 to 50,000, and more preferably 400 to 20,000.

In the method of the present invention, other polyol may be present together with the polyether diol. Examples of other polyol include diols such as ethylene glycol, propylene glycol, butanediol, tetramethylene glycol, 2,2-dimethyl-1,3-propanediol, pentanediol, and hexanediol, polyols such as glycerol and pentaerythritol, and aromatic group-containing diols such as bisphenol A and bisphenol A-ethylene oxide adducts.

A percentage of the polyether diol in the total polyol is preferably not less than 50% by weight, more preferably not less than 80% by weight, and even more preferably not less than 90% by weight.

In the transesterification between the carbonate ester and the polyether diol, a reaction molar ratio of the carbonate ester to the polyether diol is preferably 1/0.9 to 1/1.1, and more preferably 1/0.95 to 1/1.05.

In transesterification between the carbonate ester and the polyether diol, a catalyst generally used for transesterification may be used. Examples of the catalyst include alkali metals, alkaline earth metals, and alkoxides, hydrides, hydroxides, carbonates, acetates, and oxides thereof, and compounds of zinc, aluminium, tin, titanium, lead, germanium, antimony, bismuth, nickel, iron, manganese, and zirconium. Examples of the catalyst also include organic base compounds such as triethylamine and imidazole. Among these catalysts, preferred are compounds of alkali metals such as sodium, potassium, rubidium or cesium and compounds such as tin or titanium.

In transesterification between the carbonate ester and the polyether diol, a reaction temperature is preferably 100 to 300° C., more preferably 120 to 250° C., and even more preferably 120 to 200° C. A reaction pressure may be normal pressure, but preferably a reduced pressure.

The transesterification is preferably conducted by mixing the carbonate ester, the polyether diol and a catalyst, stirring the mixture at the temperature as above, and removing an alcohol, eliminated from the carbonate ester, from the reaction system. Under normal pressure, the eliminated alcohol may be effectively removed by flowing an inert gas such as nitrogen. Under reduced pressure, an eliminated, volatile alcohol may be easily removed from the reaction system.

The method of the present invention preferably includes a step of purifying a product of transesterification by removing low molecular weight components. Removal of low molecular weight components makes a product have less adhesion force to other substance, resulting in a better selective adhesive having decreased sticky feel.

Removal of low molecular weight components may be conducted by, for example, solvent purification, and more specifically, by dissolving a product of transesterification in a water-soluble solvent, and adding a hydrophobic solvent to the solution to precipitate the polyether polycarbonate containing a reduced amount of low molecular weight components.

Examples of the water-soluble solvent include alcoholic solvents such as methanol, ethanol, and isopropanol, acetone, and methylethylketone. Preferred is ethanol. Examples of the hydrophobic solvent include hydrocarbon-based solvents such as hexane and heptane. Preferred is hexane. A molecular weight distribution of the purified polyether polycarbonate may be controlled as desired by controlling an amount of the hydrophobic solvent added to the water-soluble solvent. An amount of the hydrophobic solvent added to the water-soluble solvent is preferably 0.1 to 50 times, and more preferably 0.5 to 10 times.

[Adhesive Composition]

The adhesive composition of the present invention contains the polyether polycarbonate of the present invention. A content of the polyether polycarbonate in the adhesive composition of the present invention is preferably 0.1 to 100% by weight, and more preferably 1 to 100% by weight.

The adhesive composition of the present invention may contain a solvent. Examples of the solvent include water and an alcohol having 1 to 4 carbon atoms or the like. A content of the solvent in the adhesive composition of the present invention is preferably 0.1 to 99.9% by weight, and more preferably 1 to 99% by weight.

The adhesive composition of the present invention may further contain a known tackifier according to need. The adhesive composition also may further contain optional additives such as an inorganic or organic filler, metal powder, pigment powder, an anti-aging agent, and a plasticizer.

[Method for Producing an Adhesive Sheet and an Adhesive Article]

The adhesive sheet of the present invention has a layer composed of the adhesive composition of the present invention. The method for producing the adhesive article of the present invention includes dissolving the polyether polycarbonate of the present invention in a solvent selected from water and alcohols having 1 to 4 carbon atoms, coating the resultant solution on an adherend, and volatilizing the solvent.

The adhesive sheet of the present invention may be produced by coating or transferring the adhesive composition of the present invention onto one side or both sides of an adherend, and forming the adherend into a sheet or a tape. In production, the polyether polycarbonate of the present invention may be coated, as it is, onto an adherend, or dissolved in an appropriate solvent, for example, selected from water or alcohols having 1 to 4 carbon atoms, and coated the resultant solution onto an adherend, the solvent being then volatilized.

Any known material may be used as a substrate of an adherend, including plastic films such as polyester film, porous materials such as paper, unwoven fabric, and woven fabric, and metal foils. A type and a thickness of the substrate and a thickness of the adhesive composition may be appropriately determined according to an intended use. The substrate may be a releasable substrate to be peeled upon use of the adhesive sheet or the adhesive article. In this case, the substrate may have peeling properties in itself or have a surface subjected to a peeling treatment.

Examples of the solvent selected from water and alcohols having 1 to 4 carbon atoms include water, methanol, ethanol, isopropanol, and butanol. Preferred is ethanol.

[Alcohol Solution]

The alcohol solution of the present invention contains the polyether polycarbonate of the present invention. A content of the polyether polycarbonate in the alcohol solution of the present invention is preferably 0.01 to 99.9% by weight, and more preferably 1 to 99% by weight.

An alcohol composing the alcohol solution of the present invention has 1 to 10 carbon atoms, and preferably 1 to 4 carbon atoms. A content of the alcohol in the alcohol solution of the present invention is preferably 0.1 to 99.99% by weight, and more preferably 1 to 99% by weight.

EXAMPLES

The following Examples demonstrate the present invention. Examples are intended to illustrate the present invention and not to limit the present invention.

In Examples, a weight-average molecular weight of polyether polycarbonate was measured by the following method.
<Measurement of a Weight-Average Molecular Weight>

A weight-average molecular weight was determined by gel permeation chromatography (GPC) with polystyrene gel under measurement conditions as follows. A molecular weight was calibrated with a polystyrene standard sample.

Measurement conditions of GPC
concentration of sample: 0.25% by weight (in chloroform)
injection amount of sample: 100 μl
eluent: chloroform
flow rate: 1.0 ml/min
measurement temperature: 40° C.
column: one column of "K-G" (trade name)+two columns of "K-804L" (trade name) (available from Shodex)
detector: differential refractometer (attached to a GPC apparatus, "HLC-8220GPC" (trade name, Tosoh Corporation))
polystyrene standard sample: "TSK standard POLYSTYRENE F-10" (molecular weight: 102,000), F-1 (10,200), A-1000 (870) (available from Tosoh Corporation), and "POLYSTYRENE STANDARD" (molecular weight: 900,000, 30,000; Nishio Kogyo Kabushiki Kaisya)

Comparative polymers 1 and 2 were measured under the same conditions as above, except that columns used were one column of "TSKguardcolumn HHR-H" (trade name) and two columns of "TSKgel GMHHR-H" (trade name) (available from Tosoh Corporation).

Synthesis Example 1

In a reactor equipped with a stirrer, a fractional condenser, and a thermometer, 27.1 g (0.005 mol) of random copolymer of ethylene oxide and propylene oxide (number-average molecular weight: 5000, hydroxyl value: 22.0 mgKOH/g, manufactured by ADEKA Corporation, trade name: Adeka polyether PR-5007), 1.15 g (0.005 mol) of diphenyl carbonate, and 4 mg (0.01 mmol) of cesium carbonate were stirred and heated to 160° C.

The mixture was held at the state for two hours while removing phenol generated by reaction from the reaction system. The reaction system was suctioned with a vacuum pump to reduce a pressure, and continued to react for about 4 hours while gradually increasing a temperature to 180° C. to give a polyether polycarbonate (hereinafter, referred to as polymer 1). The polymer 1 had a weight-average molecular weight of 180,000.

Synthesis Example 2

10 g of the polymer 1 prepared in Synthesis Example 1 was dissolved in 100 mL of ethanol. To this was added the two times amount of hexane, and shaken. A generated precipitate was collected. A collected polymer (hereinafter, referred to as polymer 2) had a weight-average molecular weight of 257000.

Synthesis Example 3

In a reactor equipped with a stirrer, a fractional condenser, and a thermometer, 99 g (0.02 mol) of random copolymer of ethylene oxide and propylene oxide (number-average molecular weight: 5000, hydroxyl value: 22.0 mgKOH/g, manufactured by ADEKA Corporation, trade name: Adeka polyether PR-5007), 4.2 g (0.02 mol) of diphenyl carbonate, and 16 mg (0.1 mmol) of potassium carbonate were stirred and heated to 120° C.

The reaction system was suctioned with a vacuum pump to reduce a pressure. The mixture was further heated to 145° C. Phenol generated by reaction was removed from the reaction system. The reaction system was held at the state for 4.5 hours to give polyether polycarbonate (hereinafter, referred to as polymer 3). The polymer 3 had a weight-average molecular weight of 210,000.

Comparative Synthesis Example 1

In a reactor equipped with a stirrer, a water separator, a reflux condenser connected via the water separator, and a thermometer, 51.4 g (0.027 mol) of polycarbonatediol (PLACCEL CD220PL, number-average molecular weight: 2000, hydroxyl value 58.4 mgKOH/g, manufactured by Daicel Chemical Industries Ltd.), 5.4 g (0.027 mol) of sebacic acid, 0.2 g (0.001 mol) of p-toluenesulfonic acid and 120 mL of toluene were stirred and heated to 150° C.

The mixture was held at the state for 5 hours while removing water generated by reaction together with toluene from the reaction system. After toluene was completely removed, the water separator was substituted to a cooling trap. The reactor was connected to a vacuum pump via the cooling trap. The reaction system was suctioned while at 150° C. and reacted for about 2 hours to give polycarbonate polyester (hereinafter, referred to as comparative polymer 1).

The comparative polymer 1 was measured for weight-average molecular weight by gel permeation chromatography (GPC) with polystyrene gel. A measured molecular weight was calibrated with a polystyrene standard sample. The comparative polymer 1 had a weight-average molecular weight of 75000.

Examples 1 to 3, and Comparative Example 1

Polymers 1 to 3 and comparative polymer 1 prepared in Synthesis Examples 1 to 3 and Comparative Synthesis Example 1, respectively, were evaluated for ethanol solubility and water solubility by the methods below. Results are shown in Table 1.

Polymers 1 to 3 and comparative polymer 1 were used to prepare adhesive sheets by the method below, and evaluated for selective adhesive properties by the method below. Results are shown in Table 1.

<Evaluation for Ethanol Solubility>

A polymer was added to ethanol in an amount corresponding to 5% by weight, stirred several times, and allowed to stand at room temperature. A state of the mixture was visually examined and ranked according to the rating below.
3: dissolved
2: clouded
1: precipitated <Evaluation for Water Solubility>

A polymer was added to ion-exchanged water in an amount corresponding to 5% by weight, stirred several times, and allowed to stand at room temperature. A state of the mixture was visually examined and ranked according to the rating below.
3: dissolved
2: clouded
1: precipitated <Preparation of an Adhesive Sheet>

A polymer was dissolved in toluene to give a 10% by weight solution. The solution was cast on a polyethylene terephthalate sheet at a thickness of 150 μm with a bar coater and dried (60° C., heated for 12 hours, and allowed to stand for 1 day at 25° C. and 50% RH) to give an adhesive sheet. A thickness of an adhesive layer after dried was about 10 μm.

<Evaluation for Selective Adhesive Property>

Using a tacking tester (Rhesca Corporation, TACIIUC-2006), the adhesive sheet was measured for adhesion to a polypropylene disc having an indenter area of 8 mm² (test piece available from Engineering Test Service: Mitsubishi Chemical Corporation Noblen NH-8 (polypropylene)) and attached to the top of a probe of the tacking tester. The measured value was referred to as "adhesion force". Measurement conditions were a pressing load with the probe of 200 gf, a pressing time of 0.5 sec, and a separating rate of the probe of 600 mm/sec.

The adhesive sheet was cut into a disc having an indenter area of 8 mm² and attached to the top of the probe at the opposite side of an adhesive-applied side instead of the polypropylene disc. The adhesive sheet was measured for adhesion of the adhesive-applied sides to each other under the same conditions as above. The measured value was referred to as "autohesion force". An adhesive having a ratio of autohesion force to adhesion force, autohesion/adhesion, of not less than 2 is considered as having selective adhesive properties.

Comparative Example 2

Polylauryl methacrylate (weight-average molecular weight: 545000, hereinafter referred to as comparative polymer 2) was evaluated for ethanol solubility and water solubility similarly as in Example 1. An adhesive sheet was prepared with the comparative polymer 2 similarly as in Example 1, and evaluated for selective adhesive properties. Results are shown in Table 1.

TABLE 1

|  |  | Example 1 | Example 2 | Example 3 | Comparative example 1 | Comparative example 2 |
|---|---|---|---|---|---|---|
| Polymer | reference name | Polymer 1 | Polymer 2 | Polymer 3 | Comparative polymer 1 | Comparative polymer 2 |
|  | Structure | EO-PO random polyether polycarbonate | EO-PO random polyether polycarbonate | EO-PO random polyether polycarbonate | polycarbonate polyester | polylauryl methacrylate |
|  | weight-average molecular weight | 180000 | 257000 | 210000 | 75000 | 545000 |
| Solubility | Ethanol | 3 | 3 | 3 | 1 | 1 |
|  | Water | 3 | 3 | 3 | 1 | 1 |
| selective adhesive property | autohesion force (gf) | 233 | 381 | 324 | 400 | 219 |
|  | adhesion force (gf) | 106 | 25 | 70 | 35 | 260 |
|  | autohesion/adhesion | 2.2 | 15.2 | 4.6 | 11.4 | 0.8 |

The invention claimed is:

1. An adhesive composition, comprising a polyether polycarbonate that consists of a constituent unit of formula (I):

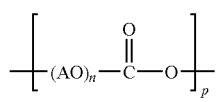

wherein each A is, independently, an alkylene group having 2 to 6 carbon atoms;

n is an average number from 5 to 1,000;

p is an average number from 5 to 100; and and wherein a weight-average molecular weight of the polyether polycarbonate is from 50,000 to 1,000,000.

2. The adhesive composition according to claim 1, wherein a content of the polyether polycarbonate in the adhesive composition is from 0.1 to 100% by weight.

3. The adhesive composition according to claim 1, further comprising a solvent.

4. An adhesive, consisting of at least one polyether polycarbonate that consists of a constituent unit of formula (I):

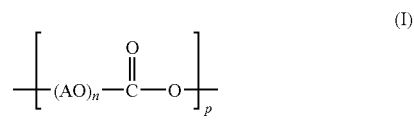

wherein each A is, independently, an alkylene group having 2 to 6 carbon atoms;

n is an average number from 5 to 1,000;

p is an average number from 5 to 100; and and wherein a weight-average molecular weight of the polyether polycarbonate is from 50,000 to 1,000,000.

5. The adhesive of claim 4, wherein the polyether polycarbonate is soluble in alcohol.

6. The adhesive of claim 5, wherein the polyether polycarbonate is soluble in water.

7. The adhesive according to claim 4, wherein A groups in formula (I) are at least two different alkylene groups.

8. The adhesive according to claim 4, wherein A groups in formula (I) are mixed groups of ethylene group and propylene group.

9. The adhesive according to claim 7 or 8, wherein A groups in formula (I) have a random structure.

10. An adhesive sheet, comprising a layer comprising the adhesive composition according to claim 1.

11. A method for producing the adhesive according to claim 4, the method comprising: transesterifying a carbonate ester and a polyether diol.

12. The method according to claim 11, wherein the polyether diol has a number-average molecular weight of 200 to 50,000.

13. The method according to claim 11 or 12, further comprising: purifying a product of the transesterification by removing low molecular weight components therefrom.

14. A method for producing an adhesive article, the method comprising:
- dissolving a polyether polycarbonate in at least one solvent selected from the group consisting of water and an alcohol having 1 to 4 carbon atoms, thereby obtaining a solution;
- coating the solution on an adherend; and
- volatilizing the solvent, thereby obtaining the adhesive article,
- wherein the adhesive article comprises the adhesive of claim 9 and the adherend.

* * * * *